US011137754B2

(12) United States Patent
Van Wiemeersch et al.

(10) Patent No.: US 11,137,754 B2
(45) Date of Patent: Oct. 5, 2021

(54) INTERMITTENT DELAY MITIGATION FOR REMOTE VEHICLE OPERATION

(71) Applicant: Ford Global Technologies, LLC, Dearborn, MI (US)

(72) Inventors: John Robert Van Wiemeersch, Novi, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 16/169,607

(22) Filed: Oct. 24, 2018

(65) Prior Publication Data
US 2020/0133259 A1 Apr. 30, 2020

(51) Int. Cl.
*G05D 1/00* (2006.01)
*B60W 50/04* (2006.01)
(Continued)

(52) U.S. Cl.
CPC ......... *G05D 1/0022* (2013.01); *B60W 50/029* (2013.01); *B60W 50/045* (2013.01);
(Continued)

(58) Field of Classification Search
CPC ............... G05D 1/0022; G05D 1/0088; G05D 2201/0213; H04W 4/40; H04W 56/0055;
(Continued)

(56) References Cited

U.S. PATENT DOCUMENTS

| 5,959,724 A | 9/1999 | Izumi |
| 6,275,754 B1 | 8/2001 | Shimizu |

(Continued)

FOREIGN PATENT DOCUMENTS

| CN | 101929921 A | 12/2010 |
| CN | 103818204 A | 5/2014 |

(Continued)

OTHER PUBLICATIONS

Translation of WO-2019087835-A1 (Year: 2019).*
(Continued)

*Primary Examiner* — Anne Marie Antonucci
*Assistant Examiner* — Sahar Motazedi
(74) *Attorney, Agent, or Firm* — Frank Lollo; Eversheds Sutherland (US) LLP

(57) ABSTRACT

Method and apparatus are disclosed for mitigating issues for a vehicle executing a remote vehicle operation, wherein there is a communication delay between the vehicle and a remote computing device providing control. An example vehicle includes a communication system, an autonomy unit for performing a remote vehicle operation, and a processor. The processor is configured to receive a remote vehicle operation control signal via the communication system from a remote computing device. The processor is also configured to determine a delay corresponding to the control signal. And the processor is further configured to modify the remote vehicle operation responsive to determining that the delay rises above a delay threshold at a threshold rate.

20 Claims, 4 Drawing Sheets

(51) Int. Cl.
*B60W 50/029* (2012.01)
*H04W 56/00* (2009.01)
*H04W 4/40* (2018.01)

(52) U.S. Cl.
CPC ............ *G05D 1/0088* (2013.01); *H04W 4/40* (2018.02); *H04W 56/0055* (2013.01); *B60W 2050/0295* (2013.01); *B60W 2050/046* (2013.01); *G05D 2201/0213* (2013.01)

(58) Field of Classification Search
CPC ............ B60W 50/029; B60W 50/045; B60W 2050/0295
See application file for complete search history.

(56) References Cited

U.S. PATENT DOCUMENTS

| | | |
|---|---|---|
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |

(56) References Cited

U.S. PATENT DOCUMENTS

| | | |
|---|---|---|
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0156227 A1* | 6/2014 | Grant .................... G01D 9/005 702/187 |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita et al. |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0355354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |

(56) References Cited

U.S. PATENT DOCUMENTS

| | | | |
|---|---|---|---|
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1 | 2/2019 | Parazynski |
| 2019/0066503 A1 | 2/2019 | Li |
| 2019/0103027 A1 | 4/2019 | Wheeler |
| 2019/0137990 A1 | 5/2019 | Golgiri |
| 2019/0232953 A1* | 8/2019 | Suzuki .................. G01C 21/20 |
| 2020/0068434 A1* | 2/2020 | Pedersen ............... H04W 4/029 |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 102014011864 A1 | 2/1916 |
| DE | 102016226008 A1 | 6/1918 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102010034129 B4 | 2/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 7/1916 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| JP | 2018052188 A | 4/1918 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| KR | 20130106005 A | 6/2006 |
| KR | 20160039460 A | 5/2008 |
| KR | 20160051993 A | 1/2010 |
| KR | 101641267 B | 9/2013 |
| KR | 20140074703 A * | 6/2014 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |

(56) References Cited

FOREIGN PATENT DOCUMENTS

| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |
| WO | WO-2019087835 A1 * | 5/2019 .............. H04Q 9/00 |

OTHER PUBLICATIONS

Machine Translation of KR20140074703A (Year: 2014).*

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Automatically Into the Parking Space—https://www.mercedes-benz.com/en/mercedes-benz/next/automation/automatically-into-the-parking-space/; Oct. 27, 2014.

Bill Howard, Bosch's View of the Future Car: Truly Keyless Entry, Haptic Feedback, Smart Parking, Cybersecurity, Jan. 9, 2017, 8 Pages.

ChargeItSpot Locations, Find a Phone Charging Station Near You, retrieved at https://chargeitspot.com/locations/ on Nov. 28, 2017.

Core System Requirements Specification (SyRS), Jun. 30, 2011, Research and Innovative Technology Administration.

Daimler AG, Remote Parking Pilot, Mar. 2016 (3 Pages).

Jingbin Liu, IParking: An Intelligent Indoor Location-Based Smartphone Parking Service, Oct. 31, 2012, 15 pages.

Land Rover develops a smartphone remote control for its SUVs, James Vincent, Jun. 18, 2015.

Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.

Perpendicular Parking—https://prezi.com/toqmfyxriksl/perpendicular-parking/.

SafeCharge, Secure Cell Phone Charging Stations & Lockers, retrieved at https://www.thesafecharge.com on Nov. 28, 2017.

Search Report dated Jan. 19, 2018 for GB Patent Application No. 1711988.4 (3 pages).

Search Report dated Jul. 11, 2017 for GB Patent Application No. 1700447.4 (3 Pages).

Search Report dated May 21, 2018 for Great Britain Patent Application No. GB 1800277.4 (5 Pages).

Search Report dated Nov. 22, 2018 for GB Patent Application No. GB 1809829.3 (6 pages).

Search Report dated Nov. 27, 2018 for GB Patent Application No. GB 1809112.4 (3 pages).

Search Report dated Nov. 28, 2017, for GB Patent Application No. GB 1710916.6 (4 Pages).

Search Report dated Nov. 28, 2018 for GB Patent Application No. GB 1809842.6 (5 pages).

Search Report dated Oct. 10, 2018 for GB Patent Application No. 1806499.8 (4 pages).

Tesla Model S Owner's Manual v2018.44. Oct. 29, 2018.

Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

INTERMITTENT DELAY MITIGATION FOR REMOTE VEHICLE OPERATION

TECHNICAL FIELD

The present disclosure generally relates to remote vehicle operation (e.g., remote park-assist) and, more specifically, to monitoring communication and mitigating issues from intermittent delay.

BACKGROUND

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained. Additionally, some vehicles include park-assist features in which the vehicle autonomously controls motive functions of the vehicle to park the vehicle into a parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring delay in the control of a vehicle for a remote vehicle operation, such as a remote park assist. An example disclosed vehicle includes a communication system, an autonomy unit for performing a remote vehicle operation, and a processor. The processor is configured to receive a remote vehicle operation control signal via the communication system from a remote computing device. The processor is also configured to determine a delay corresponding to the control signal. The processor is further configured to modify the remote vehicle operation responsive to determining that the delay rises above a delay threshold at a threshold rate.

In some examples, the delay corresponding to the control signal comprises a processing delay between an input to the remote computing device and a subsequent transmission of the input by the remote computing device. In other examples, the delay corresponding to the control signal comprises a delay between an input of the control signal to the remote computing device and a reception of the control signal by the processor.

In some examples, the processor is further configured to receive the delay corresponding to the control signal from the remote computing device.

In some examples, the processor is further configured to determine a current phase of the remote vehicle operation, determine the delay threshold based on the current phase of the remote vehicle operation, and modify the remote vehicle operation based on the current phase of the remote vehicle operation. In a particular example, the current phase of the remote vehicle operation comprises a reverse phase of a remote parking operation, and the processor is configured to modify the remote parking operation by limiting a maximum speed at which the vehicle can travel during the reverse phase.

In some examples, the processor is further configured to operate using a control loop, determine the delay for each control loop, and modify the remote vehicle operation responsive to determining that the delay rises above a delay threshold for a threshold number of consecutive control loops. Further examples may include the processor operating using a control loop, determining the delay for each control loop, and modifying the remote vehicle operation responsive to determining that the delay rises above a delay threshold for a threshold number of control loops during an execution of the remote parking operation.

In some examples, the processor is further configured to modify the remote vehicle operation by reducing a maximum operational speed available during an execution of the remote vehicle operation. Alternatively, the processor may be configured to modify the remote vehicle operation by scaling an operational speed available during an execution of the remote parking operation. Further, in some examples the remote vehicle operation comprises one of (i) a remote parking operation, (ii) a remote trailer assist operation, (iii) and a remote control of an autonomous vehicle.

An example disclosed method includes receiving, via a communication system of a vehicle and from a remote computing device, a remote vehicle operation control signal. The method also includes initiating execution of the remote vehicle operation. The method further includes determining a delay corresponding to the control signal. And, the method still further includes modifying the remote vehicle operation responsive to determining that the delay rises above a delay threshold at a threshold rate.

In some examples, the delay corresponding to the control signal comprises a processing delay between an input to the remote computing device and a subsequent transmission of the input by the remote computing device, and the method further comprises receiving the delay corresponding to the control signal from the remote computing device.

In some examples, the method may further include determining a current phase of the remote vehicle operation, determining the delay threshold based on the current phase of the remote vehicle operation, and modifying the remote vehicle operation based on the current phase of the remote vehicle operation.

In some examples, the current phase of the remote vehicle operation comprises a reverse phase of a remote parking operation, and the method further comprises modifying the remote parking operation by limiting a maximum speed at which the vehicle can travel during the reverse phase.

In some examples, the method further includes executing the remote vehicle operation using a control loop, determining the delay for each control loop, and modifying the remote vehicle operation responsive to determining that the delay rises above the delay threshold for a threshold number of consecutive control loops. Alternatively, the method may include modifying the remote vehicle operation responsive to determining that the delay rises above the delay threshold for a threshold number of control loops during the execution of the remote parking operation.

In still further examples, the method may include modifying the remote vehicle operation by reducing a maximum operational speed available during the execution of the remote vehicle operation, and/or modifying the remote vehicle operation by scaling an operational speed available during the execution of the remote parking operation.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
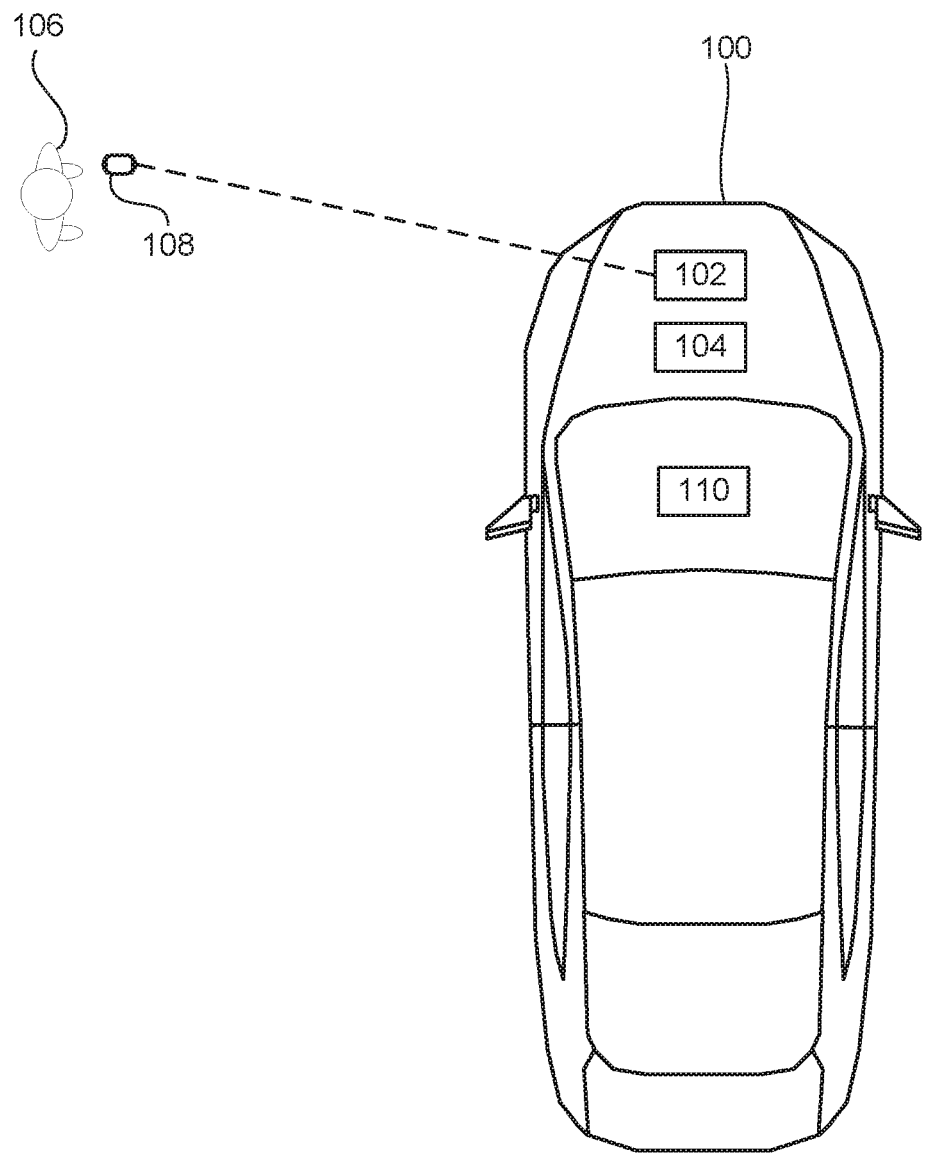
FIG. 1 illustrates an example vehicle according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Many vehicles include motive functions that are at least partially autonomously controlled by the vehicle. For example, some vehicles include cruise control in which the vehicle controls acceleration and/or deceleration of the vehicle so that a speed of the vehicle is maintained. Further, some vehicles include adaptive cruise control in which the vehicle controls acceleration and/or deceleration of the vehicle so that a speed of the vehicle and a following distance behind a lead vehicle are maintained.

Additionally, some vehicles include park-assist systems, such as remote park-assist systems, in which the vehicle autonomously controls motive functions of the vehicle to park the vehicle into a parking spot. Remote park-assist systems are configured to autonomously park and un-park a vehicle by an operator (driver) who is outside the vehicle. Some remote park-assist systems require the driver to provide a continuous input via a mobile device in wireless communication with the vehicle to instruct the vehicle to autonomously park in the parking spot or un-park. The same requirement may be present in other autonomous vehicle operations, such as remote trailer assist, or simply autonomous control of the vehicle via a remote device such as a mobile phone.

In some examples, the remote device used to command the vehicle motion for a remote park assist (RePA) operation may have one or more operational characteristics that result in processing delays, transmission delays, or other issues that can affect the RePA operation. This can cause issues because the vehicle may be required to respond quickly to a failure or a stop command from the user, such that the vehicle stops within a distance required by the specification and/or local regulations. For example, when the touchscreen of the remote device fails, wireless communication fails, or the user stops providing continuous motion, the vehicle ordinarily is required to stop within a certain distance. The distance it takes the vehicle to stop from the instant the user ceases continuous input (or communication fails) is a function of the vehicle speed and delays between the user input and the stopping system. For example, there may be delays sensing and processing a touchscreen input, processing delays in transmitting the wireless signal to the vehicle, and processing delays of the vehicle in receiving and taking action on the received signal. If any of these delays cause a sufficient length of time between when a stop command is made to when the vehicle actually stops, customers may become concerned that the RePA system is not sufficiently responsive and, if the response is sometimes good and other times too slow, they may perceive the system as unreliable and may lose confidence it will stop quick enough to their command. Further, a suitable response time to an operator's instruction to stop is also a back-up to the primary collision avoidance sensing capability of RePA systems. If the primary collision avoidance system is not functioning and the remote interface response is too slow or temporarily becomes slower than that for which the customer is accustomed to experiencing, then the vehicle may run into an object, cause an injury, or otherwise fail to properly execute the remote vehicle operation.

In order to mitigate problems that arise from increased delays, one or more examples herein may include reducing a speed at which the vehicle can travel during execution of the remote vehicle operation, or during a particular phase or segment of the operation. If the speed is reduced, the vehicle may still be able to stop within an appropriate distance if a stop command is given, even where it is delayed in transit or processing.

However, in some cases, the delay between a user input and the vehicle responding to the input (e.g., after processing and transmission of the signal) may change over time. The delay may intermittently exceed a threshold that would initiate a stop event or cause the vehicle to reduce its speed. The vehicle may execute the remote vehicle operation using a control loop, which determines the delay between the remote device and the vehicle over time. If the delay goes up and down over time, it may sometimes be low enough to allow the vehicle to operate normally, and sometimes be high enough to cause the vehicle to reduce an allowable speed.

With these issues in mind, example embodiments of the present disclosure may assist in mitigating problems that arise from having the delay between a remote device and a vehicle fluctuate above and below a delay threshold, wherein detecting a delay above the delay threshold would ordinarily result in stop event or reduction in speed of the vehicle.

As used herein, "remote parking," "vehicle remote park-assist," "remote park-assist," and "RePA" refer to a vehicle controlling motive functions of the vehicle without direct steering or velocity input from an operator to autonomously park the vehicle into a parking spot while the operator is located outside of the vehicle. For example, a remote park assist-system of an autonomy unit controls the motive functions of the vehicle upon initiation from a driver to remotely park the vehicle into a parking spot.

As used herein, to "tether" refers to enabling a mobile device or remote computing device to cause a vehicle to perform remote parking. For example, a vehicle is configured to perform remote parking upon receiving instruction(s) to do so from a mobile device when the mobile device is tethered to the vehicle and is configured to not perform remote parking when the mobile device is untethered from the vehicle. As used herein, a "tethered" device refers to a mobile device that is enabled to send instructions to a vehicle to perform remote parking. For example, a mobile device is tethered to a vehicle responsive to the mobile device being wirelessly communicatively coupled to the vehicle and located within a predetermined tethering range (e.g., 6 meters) of the vehicle. In such examples, a mobile device that sends instructions to a vehicle to perform remote parking is untethered from the vehicle if the mobile device is beyond the tethering range of the vehicle. In some examples, a mobile device of an operator is tethered via communication between the vehicle and another device (e.g., a key fob) carried by the operator. In such examples, the vehicle may detect that the key fob is within a predetermined tethering range of the vehicle, presume that the operator is carrying both the key fob and the mobile device associated with the operator, and subsequently tether the mobile device to the vehicle.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). Further, the vehicle may be a snow blower, lawnmower, watercraft or other motorized vehicle with sufficient onboard steering and velocity controls to receive commands from a remote device with the capabilities taught in this application. In the illustrated example, the vehicle 100 includes a communication system 102, an autonomy unit 104, and a processor 110.

Vehicle 100 may also include an engine, a transmission, and various other motive elements. The engine may include an internal combustion engine, an electric motor, a fuel-cell engine, and/or any other type of engine or motor that is configured to propel the vehicle 100. For example, an internal combustion engine generates mechanical power to propel the vehicle 100 by combusting fuel (e.g., gasoline, petrol, etc.), and an electric motor generates mechanical power to propel the vehicle 100 by converting electrical energy stored in a battery (e.g., of a battery cell and/or a battery pack) into mechanical energy. The transmission may control an amount of power generated by the engine that is transferred to other components of the vehicle 100, such as a powertrain, wheels, etc. For example, the transmission may include a gearbox that controls the amount of power transferred to the components of the vehicle 100. A gear stick may enable an operator (e.g., a driver) of the vehicle 100 to control a setting of the transmission that affects how the engine propels the vehicle 100. For example, the gear stick may enable the operator to position the transmission in park, neutral, reverse, drive, first gear, etc. Further, the vehicle 100 of the illustrated example may include an engine sensor and a transmission position sensor. The engine sensor may detect whether the engine is activated or deactivated. The transmission position sensor may detect a current position (e.g., park, neutral, reverse, drive, first gear, etc.) of the transmission and/or the gear stick.

The vehicle 100 of the illustrated example also includes a communication system 102 that may be configured to communicatively connect to a remote device of a user of the vehicle 100 (e.g., remote computing device 108 of user 106). The communication system 102 may include hardware and firmware to establish a wireless connection with the remote computing device 108. For example, the communication system 102 may be a wireless personal area network (WPAN) module that wirelessly communicates with mobile device(s) of user(s) via short-range wireless communication protocol(s). In some examples, the communication system 102 may implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. Additionally, or alternatively, the communication system 102 may be configured to wirelessly communicate via Wi-Fi®, Wi-Fi® low power, Near Field Communication (NFC), UWB (Ultra-Wide Band), and/or any other short-range and/or local wireless communication protocol (e.g., IEEE 802.11 a/b/g/n/ac) that enables the communication system 102 to communicatively couple to a remote computing device. In some examples, the communication system 102 may wirelessly communicate via Wi-Fi® and/or Wi-Fi® low power protocols (e.g., Wi-Fi HaLow™ operating at 900 MHz) to facilitate communication with a remote computing device when a line-of-sight between the communication system 102 and the remote computing device is interrupted. Further, in some examples, vehicle 100 may utilize a Li-Fi protocol (e.g., a light-based LAN communication protocol) and/or a mid-frequency UHF protocol (e.g., at 433 MHz or 902 MHz) to communicate with one or more remote computing devices.

As illustrated in FIG. 1, vehicle 100 may also include an autonomy unit 104. The autonomy unit 104 may be an electronic control unit (ECU) (e.g., one of a plurality of electronic control units 350 of FIG. 3) of the vehicle 100 that performs autonomous and/or semi-autonomous functions of the vehicle 100. For example, the autonomy unit 104 may autonomously control motive functions of the vehicle 100 to perform remote parking of the vehicle 100 into an available parking spot (e.g., parking spot 220 of FIG. 2) and/or to otherwise autonomously and/or semi-autonomously drive the vehicle 100. In some examples, the autonomy unit 104 may autonomously control the vehicle 100 to position a trailer hitch to be coupled to a trailer. In still further examples, the autonomy unit 104 may autonomously control vehicle 100 to back up while a trailer is coupled to the vehicle. The autonomy unit 104 may control motive functions of the vehicle 100 based on data collected from sensor(s) (e.g., radar sensor(s), lidar sensor(s), ultrasonic sensor(s), etc.) of the vehicle 100 and/or camera(s) of the vehicle 100.

Vehicle 100 may also include a processor 110 configured to carry out one or more functions or acts, such as those described herein. Processor 110 may be configured to receive a remote vehicle operation control signal via the communication system 102, from a remote computing device such as device 108.

As noted above, the remote vehicle operation may be a remote park assist maneuver, a remote trailer assist maneuver, or any other operation of the vehicle in which the operator provides control via a remote computing device.

The control signal may be continuous input from driver commanding the vehicle to perform an operation. The control signal may also be a command to stop movement, modify a speed, or take some other action.

In some examples, failure to provide a continuous input by the user 106 to the remote computing device 108 may result in the vehicle 100 defaulting to stop movement Whenever communication is lost, the vehicle may not continue to move. However, because of the delay in processing by the remote computing device, transmission to the vehicle, and/or processing delays in the vehicle, there is a period of time between when the input has ceased and the vehicle determines it must stop.

Remote computing device 108 may be any suitable device, including a mobile phone, tablet, key fob, or any other devices for providing a control signal to vehicle 100.

Remote computing device 108 may have one or more operating characteristics that are specific to the device. For instance, there may be delays between when a user 106 provides an input (e.g., touch, tap, click, remove a touch, or otherwise interacts with the device) and when that input is recognized by the remote computing device. This may be called a processing delay. The processing delay may depend on one or more device characteristics, such as processor speed, available memory, currently operating applications, and more. As such, the processing delay for two remote computing devices may be significantly different. This difference can cause noticeable differences in the operation of a remote vehicle operation.

Other delays may include a transmission delay between the remote computing device 108 and the vehicle 100 (i.e., the communication system, 102), and a second processing delay by the vehicle 100 to recognize and act on the received control signal.

Processor 110 may be configured to determine a delay corresponding to the control signal received via the communication system 102. The determined delay may include a processing delay of the remote computing device. In some examples, the delay may comprise a processing delay between an input to the remote computing device and a subsequent transmission of the input by the remote computing device.

In some examples, the delay may include a transmission between the remote computing device 108 and the communication system 102. The delay may also or alternatively include a processing delay of the vehicle, communication system 102, and/or processor 110 itself.

In some examples, some part or all of the delay may be determined by the remote computing device 108 itself. Alternatively, some or all of the delay may be determined by the vehicle and/or processor 110. If determined in whole or part by the remote computing device 108, the delay may be transmitted from the remote computing device 108 to the vehicle 100 via the communication system 102.

In some examples, vehicle 100 may perform an independent or secondary determination of delay, even where the delay is determined and sent by the remote computing device 108. Vehicle 100 and/or processor 110 may compare the determined delay to a received delay from the remote computing device to ensure that it is accurate.

In some examples, processor 110 may also determine a delay threshold. The delay threshold may correspond to an allowable delay, above which issues arise wherein the vehicle may not be able to stop in an adequate time/distance when an input ceases. Regulations and specification of the operation of the vehicle may require that the vehicle stop within a predetermined distance once an input ceases or a stop command is received. If the delay is greater than the delay threshold, the vehicle may not be able to stop in the predetermined distance.

In some examples, the vehicle may determine that the delay is above the delay threshold, and responsively stop the vehicle from moving. In other examples, the vehicle may reduce a maximum speed at which the vehicle can travel. Further examples may include the vehicle scaling the speed available to the vehicle during execution of the remote vehicle operation, such that even if the vehicle is going at slower than a maximum allowable speed, it may be reduced as well. Still other examples may include modifying or limiting the maximum steering wheel angle during the maneuver or a phase of the maneuver, highest or maximum wheel speed of vehicle speed, maximum lateral distance calculated, and/or maximum longitudinal distance estimated to complete the maneuver.

Figure 2:
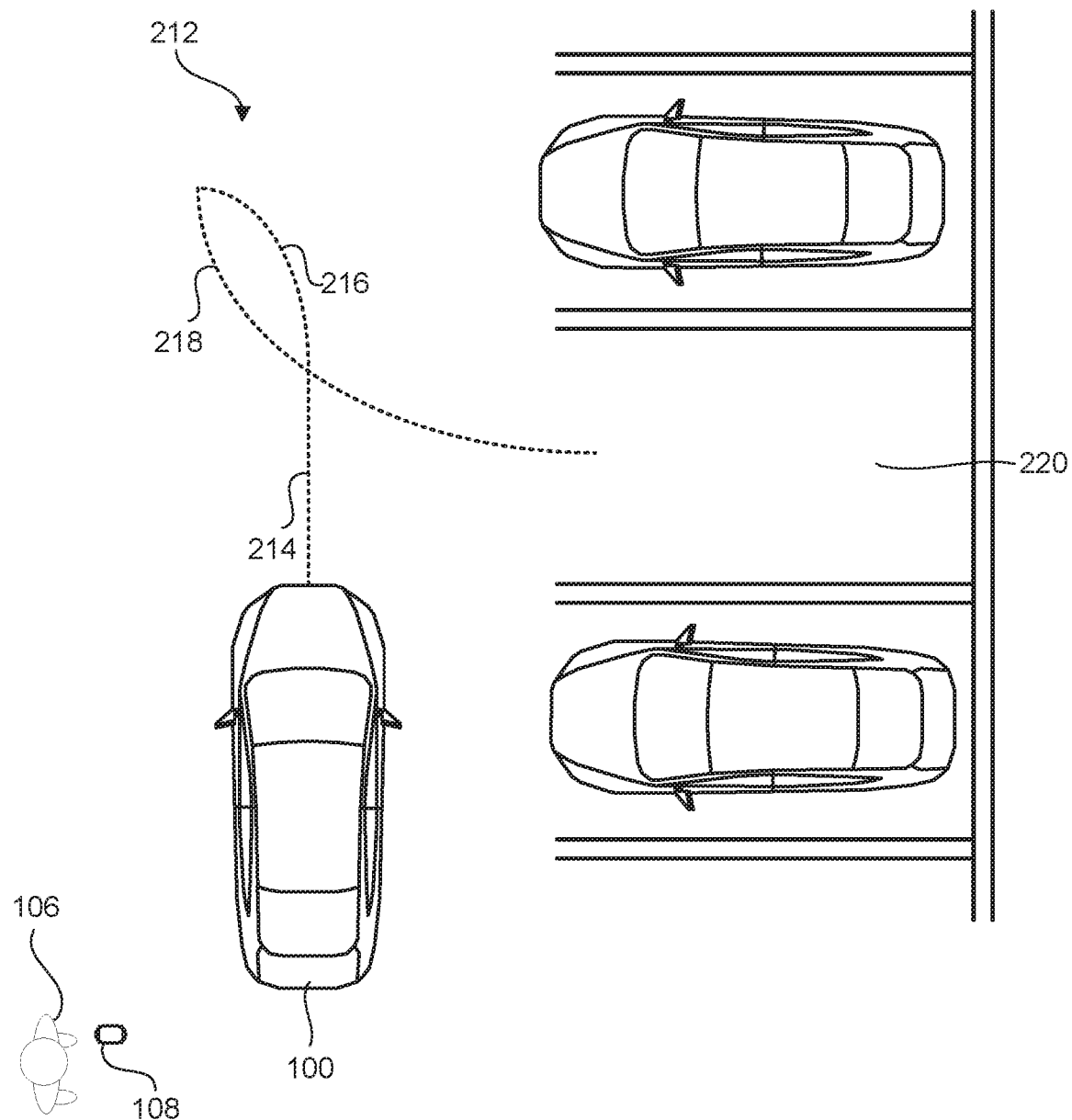
FIG. 2 illustrates the example vehicle of FIG. 1 executing a remote vehicle operation according to embodiments of the present disclosure.

In some examples, the delay threshold may change or be determined based on a current phase of the remote vehicle operation. FIG. 2 illustrates a remote park assist operation in which vehicle 100 attempts to park in parking spot 220. The park assist operation may include determining a vehicle path 212 for the vehicle 100 to follow during execution of the remote park assist operation.

As shown in FIG. 2, example vehicle path 212 includes a forward straight phase 214, a forward turning phase 216, and a reverse turning phase 218. It should be noted that vehicle path 212 is only one possible example of a remote park assist operation path, and that many other variations and examples are possible as well, including those with more or fewer phases, and/or different types of phases than the straight and turning forward and reverse phases shown.

In some examples, processor 110 may determine which phase vehicle 100 is currently executing, and responsively determine the delay threshold based on the phase. In a particular example, the current phase of the remote vehicle operation may be a reverse phase 218 of the remote parking operation. The processor may then be configured to modify the remote parking operation by limiting the maximum speed at which the vehicle can travel during the reverse phase 218.

In some examples, the delay threshold may be higher in one phase than another. For instance, the forward straight phase 214 may correspond to a higher delay threshold than the reverse turning phase 218, because operating in phase 214 may make it less likely that the vehicle will run into obstacles such as the vehicles in parking spots adjacent to spot 220. And in the reverse turning phase 218, vehicle 100 may be required to stop more quickly due to its relative proximity to nearby vehicles in the adjacent parking spots. Other phases may have different delay thresholds depending on the specific characteristics of the phases themselves, and the various speed and power requirements of the vehicle when operating in those phases.

In some examples, the delay threshold may be based on a particular mode that the vehicle operates in as well. Modes may correspond to particular remote vehicle operations, such as a remote park assist mode, a remote trailer assist mode, an autonomous movement mode, and more. Each mode may have a particular set of rules for determining what the delay threshold should be, such that a straight forward phase may correspond to a different delay threshold when operating in a remote park assist mode than in a remote trailer assist mode.

Processor 110 may also be configured to modify the remote vehicle operation and/or at least one or more characteristics of the remote vehicle operation responsive to determining that the delay rises above the delay threshold at a threshold rate.

Embodiments disclosed herein may generally concern situations in which the delay between the remote computing device and the vehicle fluctuates up and down over time, such that the delay is sometimes low enough to enable full speed movement during the remote vehicle operation, and is sometimes high enough to cause concern about whether the vehicle will be able to stop in time if a control signal is interrupted.

The threshold rate may correspond to a determination that the delay rises above the delay threshold a particular number of times in a given period of time (e.g., 10 times in 1 minute). In some examples, the threshold rate may correspond to a determination that the delay rises above the delay threshold a particular number of total times during the execution of the remote parking operation more generally (e.g., 50 times before an end of the execution of the remote parking operation).

In some examples, the remote vehicle operation (e.g., remote park assist) may be carried out using a control loop. One or more actions described herein may be taken responsive to determining that the delay rises above the delay threshold during a particular number of consecutive control loops (e.g., 10 control loops in a row). It should be understood that other numbers of consecutive control loops may be used as well. In other cases, action may be taken responsive to determining that the delay rises above the delay threshold a particular number of total control loops during execution of the remote parking operation (e.g., 50 control loops, albeit not necessarily consecutively).

In some examples, processor 110 may increment a counter for each instance and/or control loop for which the delay rises above the delay threshold. The "rate" may refer to any of the options disclosed above, such as the number of instances where the delay rises above the delay threshold in a time period, number of instances during the execution of the remote parking operation more generally, number of consecutive control loops, number of total control loops, and more.

Processor 110 may also be configured to modify the remote vehicle operation responsive to the determinations above. Modifying the remote vehicle operation can include reducing a maximum speed at which the vehicle can travel during execution of the operation, and/or during execution of a particular phase of the operation. In some examples, modifying the remote vehicle operation may include scaling down a speed at which the vehicle can travel during the operation and/or during a particular phase of the operation. The vehicle may not always move at a maximum allowable speed during execution of remote vehicle maneuver, and by scaling the speed, the vehicle may reduce its speed during certain phases regardless of whether the maximum speed is available or not.

In some examples, the specifics of modification of the remote vehicle operation may depend on the current phase of the remote vehicle operation. For instance, a maximum speed may be reduced during a turning maneuver, but the speed may be scaled during a straight phase. Other combinations may apply as well.

In some examples, the extent of the modification of the remote vehicle operation may depend on the extent of the delay, and/or how many times the delay rises above the delay threshold. For instance, if the delay rises above the delay threshold for 10 consecutive control loops, the maximum speed may be reduced by 10%. Then if the delay continues to be above the delay threshold for another 10 control loops, the maximum speed may be further reduced by an additional 10%. This is given as one possible example, and it should be understood that other examples may apply as well.

In some examples, various other considerations may be used to determine the delay, delay threshold, and other metrics described herein. For example, the delay threshold may be determined based on the capability of proximity sensors of the vehicle, and/or conditions influencing the stopping distance of the vehicle.

In particular, the proximity sensors may have an error associated with their collected data, and a larger error may require a short remote command delay threshold. Similarly, the sensors may have a field of view, such that more sensor coverage around the vehicle could lead to longer acceptable command delay thresholds. The sensors may also have a particular update rate, and example embodiments may include a longer sensor update interval causing a shorter remote command delay threshold Conditions influencing stopping distances can include the vehicle load, the road or ground conditions, environmental conditions, road grades, and more. Specifically, vehicles that are more heavily loaded may require more distance to stop, all else being equal. This causes a longer remote device command thresholds to be used. The condition of friction surfaces needed for braking (e.g., worn brakes or tires) may increase a stopping distance and may cause a shorter remote command delay threshold Environmental conditions such as road grades, slippery surfaces, and deformable surfaces (e.g., gravel) can also affect the delay threshold. A longer threshold delays could be allowed when traveling uphill since the vehicle will not take as long to stop.

Figure 3:
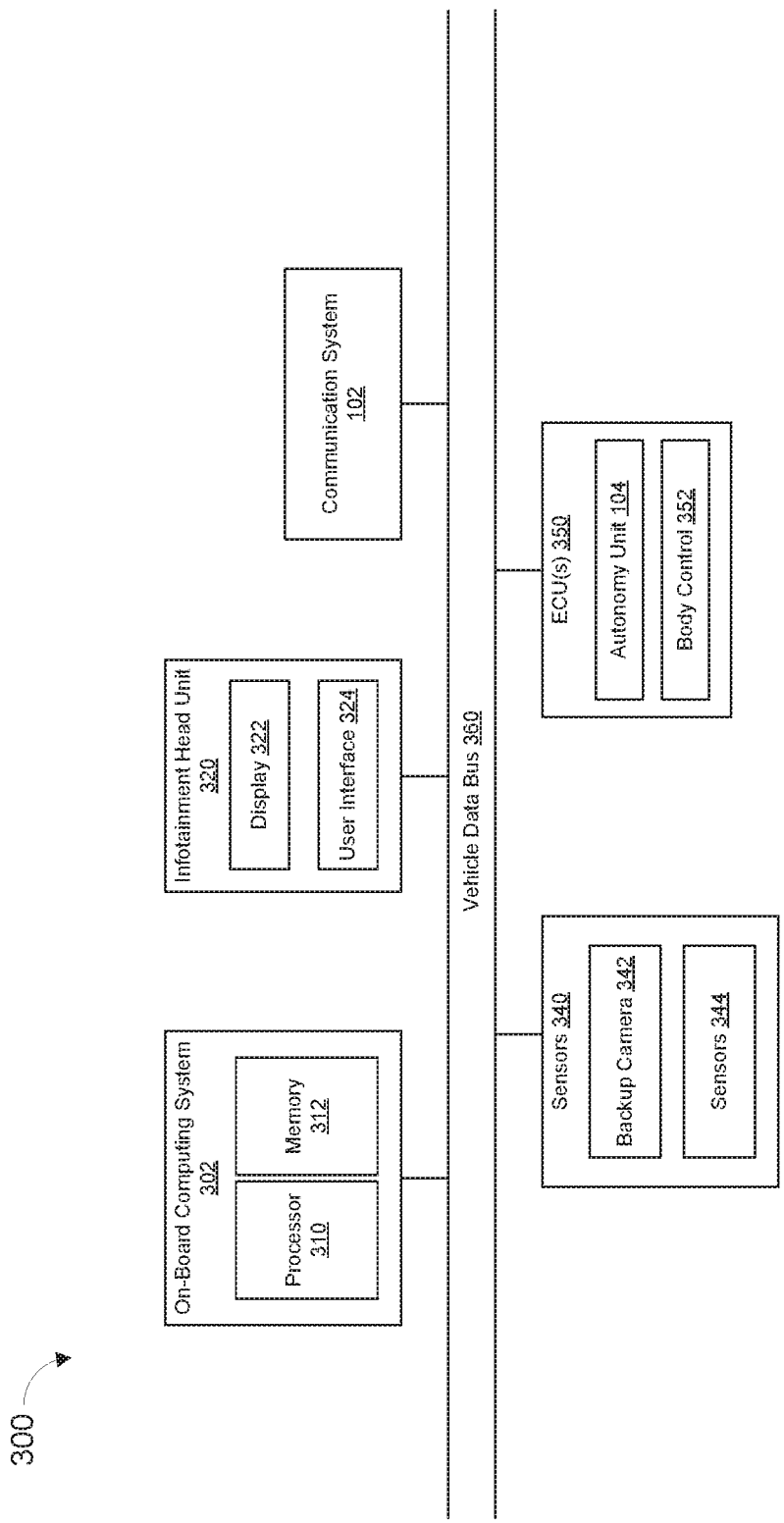
FIG. 3 is a block diagram of example electronic components of the vehicle of FIG. 1.

FIG. 3 illustrates a block diagram of example electronic components 300 of the vehicle 100. As illustrated in FIG. 3, the electronic components 300 include an on-board computing system 302, an infotainment head unit 320, the communication system 102, sensors 340, electronic control units (ECUs) 350, and a vehicle data bus 360.

The on-board computing system 302 may include a microcontroller unit, controller or processor 310 and memory 312. In some examples, the processor 310 of the on-board computing system 302 is structured to include the processor 110 described above. Alternatively, in some examples, the processor 110 is incorporated into another electronic control unit (ECU) with its own processor 310 and memory 312. The processor 310 (and/or processor 110) may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 312 includes multiple kinds of memory, particularly volatile memory and non-volatile memory.

The memory 312 may be computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 320 may provide an interface between vehicle 100 and a user. The infotainment head unit 320 may include one or more input and/or output devices, such as display 322, and user interface 324, to receive input from and display information for the user(s). The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a head-up display, a center console display (e.g., a liquid crystal display (LCD), an organic light emitting diode (OLED) display, a flat panel display, a solid state display, etc.), and/or speakers. In the illustrated example, the infotainment head unit 320 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). In some examples the infotainment head unit 320 may share a processor with on-board computing system 302. Additionally, the infotainment head unit 320 may display the infotainment system on, for example, a center console display of vehicle 100.

The sensors 340 may be arranged in and around the vehicle 100 to monitor properties of the vehicle 100 and/or an environment in which the vehicle 100 is located. One or more of the sensors 340 may be mounted to measure properties around an exterior of the vehicle 100. Additionally or alternatively, one or more of the sensors 340 may be mounted inside a cabin of the vehicle 100 or in a body of the vehicle 100 (e.g., an engine compartment, wheel wells, etc.) to measure properties in an interior of the vehicle 100. For example, the sensors 340 may include accelerometers, odometers, tachometers, pitch and yaw sensors, wheel speed sensors, microphones, tire pressure sensors, biometric sensors and/or sensors of any other suitable type.

In the illustrated example, the sensors 340 may include a backup camera 342, and various ultrasonic radar and/or lidar sensors 344. These sensors may be used to gather data about the vehicle surroundings, so as to properly execute an autonomous remote vehicle operation.

The ECUs 350 may monitor and control the subsystems of the vehicle 100. For example, the ECUs 350 may be discrete sets of electronics that include their own circuit(s) (e.g., integrated circuits, microprocessors, memory, storage, etc.) and firmware, sensors, actuators, and/or mounting hardware. The ECUs 350 communicate and exchange information via a vehicle data bus (e.g., the vehicle data bus 360). Additionally, the ECUs 350 may communicate properties (e.g., status of the ECUs 350, sensor readings, control state, error and diagnostic codes, etc.) to and/or receive requests from each other. For example, the vehicle 100 may have seventy or more of the ECUs 350 that are positioned in various locations around the vehicle 100 and are communicatively coupled by the vehicle data bus 360.

In the illustrated example, the ECUs 350 include the autonomy unit 104 and a body control module 352. The autonomy unit 104 may control performance of autonomous and/or semi-autonomous driving maneuvers (e.g., remote parking) of the vehicle 100 based upon, at least in part, image(s) and/or video captured by camera(s) and/or data collected by one or more of the sensors 340 of the vehicle 100. The body control module 352 may control one or more subsystems throughout the vehicle 100, such as power windows, power locks, an immobilizer system, power mirrors, etc. For example, the body control module 352 may include circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 360 may communicatively couple the on-board computing system 302, infotainment head unit 320, communication system 102, sensors 304, and/or ECUs 350. In some examples, the vehicle data bus 360 includes two or more data buses. The vehicle data bus 360 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
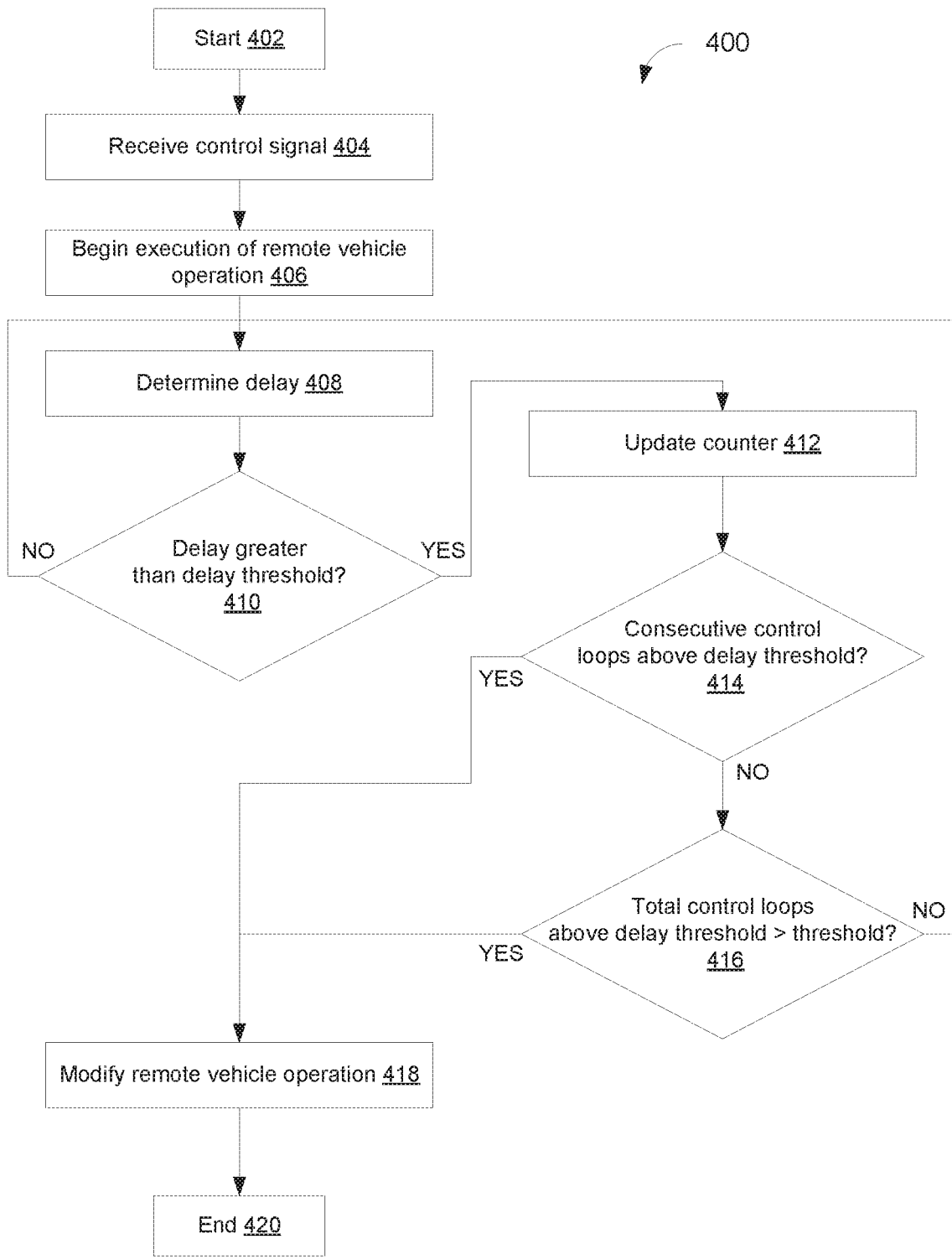
FIG. 4 is a flowchart of an example method according to embodiments of the present disclosure.

FIG. 4 illustrates an example method 400 according to embodiments of the present disclosure. Method 400 may enable a vehicle to mitigate issues that arise during a remote vehicle operation when a delay between the vehicle and a remote computing device fluctuates around a delay threshold. The flowchart of FIG. 4 is representative of machine readable instructions that are stored in memory (such as the memory 312 of FIG. 3) and include one or more programs which, when executed by a processor (such as processor 310 and/or processor 110), cause the vehicle 100 to carry out the functions and actions described herein. While the example program is described with reference to the flowchart illustrated in FIG. 4, many other methods of implementing the methods described herein may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Method 400 may start at block 402. At block 404, method 400 may include receiving a control signal. As noted above, the control signal may be sent from a remote computing device for the purpose of controlling a vehicle to perform a remote vehicle operation, such as a remote park assist, remote trailer assist, or other operations. The control signal may be transmitted from the remote computing device to a communication system of the vehicle.

At block 406, method 400 may include beginning execution of the remote vehicle operation corresponding to the control signal. This can include initializing one or more systems or functions, or carrying out one or more other actions. At block 408, method 400 may include determining a delay corresponding to the control signal. As noted above, the delay may include a processing delay of the remote computing device, the communication system, the processor, and/or other systems involved in the control of the remote vehicle operation. The delay may also include a transmission delay from the remote computing device to the vehicle.

At block 410, method 400 may include determining whether the delay is greater than a delay threshold. The delay threshold may be determined in one or more of the ways described above, and may generally correspond to an amount of delay at which the vehicle should take action to reduce speed or stop, such that it is able to stop within a predetermined distance if communication with the remote computing device is lost. If the delay is lower than the delay threshold, the method may include continuing to execute the remote vehicle operation, and continuing to monitor and determine the delay. In some examples this may be part of a control loop of the processor.

If the delay is greater than the delay threshold, method 400 may include updating a counter at block 412. The counter may keep track of the number of times (both consecutively, and overall) that the delay is determined to be above the delay threshold. The counter allows the processor executing the method to determine whether the delay has momentarily risen above the threshold, or if it has remained above the threshold for a period of time (i.e., whether the delay has spiked and returned back to normal, or whether the delay has remained too high).

At block 414, method 400 may include determining whether the number of consecutive control loops for which the delay was greater than the delay threshold is larger than a second threshold. For instance, this can include determining a threshold of 10 consecutive control loops and determining whether the counter has increased to 10 consecutive control loops.

If the number of consecutive control loops for which the delay was above the delay threshold is not large enough, method 400 may include determining whether the number of total control loops for which the delay is above the delay threshold is greater than a third threshold, at block 416. For instance, this can include determining whether there have been 100 total control loops during execution of the remote vehicle operation for which the delay has been greater than the delay threshold. If this is not true, the method may proceed back to block 408 at which the delay is again determined. Proceeding from block 408 through block 416 and back may constitute one control loop. Similarly, proceeding from block 408 through block 410, and back to block 408 may constitute a control loop.

However, if the determinations of either block 414 or block 416 indicate that the delay rises above the delay threshold at a particular rate (e.g., consecutively in a given time period, or total times during execution of the remote vehicle operation), then method 400 may proceed to block 418.

At block 418, method 400 may include modifying the remote vehicle operation. This can include reducing a maximum speed, scaling the available speed, or taking various other actions with respect to the execution of the remote vehicle operation, such as those described herein. Method 400 may then end at block 420.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "unit," and "node" refer to hardware with circuitry to provide communication, control and/or monitoring capabilities, often in conjunction with sensors. A "module," a "unit," a "node" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a communication system;
   an autonomy unit comprising one or more electronics, the autonomy unit configured to perform a remote vehicle operation; and
   a processor configured to:
   receive a remote vehicle operation control signal via the communication system from a remote computing device;
   determine a delay corresponding to the control signal;
   determine that the delay rises above a delay threshold, wherein the delay has occurred in two or more control loops during a time period;
   update a counter configured to keep track of a number of control loops where the delay is above the delay threshold among the two or more control loops during the time period;
   determine that the counter has increased to a first number of control loops where the delay is above the delay threshold among the two or more control loops during the time period;
   determine that the first number of control loops is greater than a threshold number of control loops; and
   modify, based on determining that the first number of control loops is greater than the threshold number of control loops, the remote vehicle operation.

2. The vehicle of claim 1, wherein the delay corresponding to the control signal comprises a processing delay between an input to the remote computing device and a subsequent transmission of the input by the remote computing device.

3. The vehicle of claim 2, wherein the processor is further configured to receive the delay corresponding to the control signal from the remote computing device.

4. The vehicle of claim 1, wherein the delay corresponding to the control signal comprises a delay between an input of the control signal to the remote computing device and a reception of the control signal by the processor.

5. The vehicle of claim 1, wherein the processor is further configured to:
   determine a current phase of the remote vehicle operation;
   determine the delay threshold based on the current phase of the remote vehicle operation; and
   modify the remote vehicle operation based on the current phase of the remote vehicle operation.

6. The vehicle of claim 5, wherein the current phase of the remote vehicle operation comprises a reverse phase of a remote parking operation, and wherein the processor is further configured to modify the remote parking operation by limiting one or more of (i) a maximum speed at which the vehicle can travel during the reverse phase, (ii) a maximum steering wheel angle during the reverse phase, (iii) a maximum lateral distance calculated, and (iv) a maximum longitudinal distance required to complete the reverse phase.

7. The vehicle of claim 1, wherein the processor is further configured to:
   determine one or more proximity sensor conditions; and
   determine the delay threshold based on the one or more proximity sensor conditions.

8. The vehicle of claim 1, wherein the processor is further configured to:
   determine one or more ground conditions; and
   determine the delay threshold based on the one or more ground conditions.

9. The vehicle of claim 1, wherein the threshold number of control loops is a threshold number of consecutive control loops,
   wherein determining that the counter has increased to the first number of control loops where the delay is above the delay threshold among the two or more control loops comprises:
      determining that the counter has increased to a number of consecutive control loops where the delay is above the delay threshold among the two or more control loops during the time period,
   wherein determining that the first number control loops is greater than the threshold number of control loops comprises:
      determining that the first number of consecutive control loops is greater than the threshold number of consecutive control loops.

10. The vehicle of claim 1, wherein the threshold number of control loops is a threshold number of total control loops, and wherein the processor is further configured to:
    determine that the counter has increased to a first number of consecutive control loops where the delay is above the delay threshold among the two or more control loops during the time period; and
    determine that the first number of consecutive control loops is less than a threshold number of consecutive control loops,
    when the first number of consecutive control loops is less than the threshold number of consecutive control loops then determining that the first number of control loops is greater than the threshold number of control loops comprises:
       determining that the first number of control loops is greater than the threshold number of total control loops.

11. The vehicle of claim 1, wherein the processor is further configured to modify the remote vehicle operation by reducing a maximum operational speed available during an execution of the remote vehicle operation.

12. The vehicle of claim 1, wherein the processor is further configured to modify the remote vehicle operation by scaling an operational speed available during an execution of the remote vehicle operation.

13. The vehicle of claim 1, wherein the remote vehicle operation comprises one of (i) a remote parking operation, (ii) a remote trailer assist operation, (iii) and a remote control of an autonomous vehicle.

14. A method comprising:
    receiving, via a communication system of a vehicle and from a remote computing device, a remote vehicle operation control signal;
    initiating execution of a remote vehicle operation;
    determining a delay corresponding to the control signal;
    determining that the delay rises above a delay threshold, wherein the delay has occurred in two or more control loops during a time period;
    updating a counter configured to keep track of a number of control loops where the delay is above the delay threshold among the two or more control loops;
    determining that the counter has increased to a first number of control loops where the delay is above the delay threshold among the two or more control loops during the time period;
    determining that the first number of control loops is greater than a threshold number of control loops; and
    modifying, based on determining that the first number of control loops is greater than the threshold number of control loops, the remote vehicle operation.

15. The method of claim 14, wherein the delay corresponding to the control signal comprises a processing delay between an input to the remote computing device and a subsequent transmission of the input by the remote computing device, and wherein the method further comprises:
    receiving the delay corresponding to the control signal from the remote computing device.

16. The method of claim 14, further comprising:
    determining a current phase of the remote vehicle operation;
    determining the delay threshold based on the current phase of the remote vehicle operation; and
    modifying the remote vehicle operation based on the current phase of the remote vehicle operation.

17. The method of claim 16, wherein the current phase of the remote vehicle operation comprises a reverse phase of a remote parking operation, and wherein the method further comprises:
    modifying the remote parking operation by limiting a maximum speed at which the vehicle can travel during the reverse phase.

18. The method of claim 14, wherein the threshold number of control loops is a threshold number of consecutive control loops, and
    wherein determining that the counter has increased to the first number of control loops where the delay is above the delay threshold among the two or more control loops comprises:
       determining that the counter has increased to a first number of consecutive control loops where the delay is above the delay threshold among the two or more control loops during the time period,
    wherein determining that the first number of control loops is greater than the threshold number of control loops comprises:
       determining that the first number of consecutive control loops is greater than the threshold number of consecutive control loops.

19. The method of claim 14, wherein the threshold number of control loops is a threshold number of total control loops, and wherein the method further comprises:
    determining that the counter has increased to a first number of consecutive control loops where the delay is above the delay threshold among the two or more control loops during the time period; and
    determining that the first number of consecutive control loops is less than a threshold number of consecutive control loops,
    when the first number of consecutive control loops is less than the threshold number of consecutive control loops then determining that the first number of control loops is greater than the threshold number of control loops comprises:
       determining that the first number of control loops is greater than the threshold number of total control loops.

20. The method of claim 14, further comprising modifying the remote vehicle operation by reducing a maximum operational speed available during the execution of the remote vehicle operation.

\* \* \* \* \*